Nov. 7, 1967   C. I. CRAWFORD ET AL   3,351,850
ELECTRO-MAGNETIC PICKOFF DEVICES

Filed Aug. 9, 1965   2 Sheets-Sheet 1

INVENTORS
C. I. CRAWFORD
K. R. BROWN

BY
Cameron, Kerkam & Sutton
ATTORNEYS

Nov. 7, 1967  C. I. CRAWFORD ET AL  3,351,850
ELECTRO-MAGNETIC PICKOFF DEVICES
Filed Aug. 9, 1965  2 Sheets-Sheet 2

INVENTORS
C. I. CRAWFORD
K. R. BROWN
BY
Cameron, Kerkam + Sutton
ATTORNEYS

United States Patent Office 3,351,850
Patented Nov. 7, 1967

3,351,850
ELECTRO-MAGNETIC PICKOFF DEVICES
Charles Ian Crawford, Edinburgh, and Kenneth Robson Brown, Midlothian, Scotland, assignors to Ferranti, Limited, Lancashire, England, a company of Great Britain and Northern Ireland
Filed Aug. 9, 1965, Ser. No. 478,078
Claims priority, application Great Britain, Aug. 21, 1964, 34,208/64
11 Claims. (Cl. 323—51)

This invention relates to electromagnetic pickoff devices of the type for providing an alternating output voltage the amplitude and phase of which with respect to a source voltage are responsive to the straight-line movement over a restricted range of a component with respect to a datum position defined by a reference structure. Devices of that type will hereinafter be referred to as being of the type stated, and the movable component and the reference structure as the armature and the stator.

An object of the invention is to provide a device of the type stated of considerable sensitivity.

Another object is to provide such a device which gives a substantially linear response over the restricted range of movement.

A further object is to provide such a device which is to a large extent free from zero drift and from changes of sensitivity.

In accordance with the present invention, an electromagnetic pickoff device includes a stator, an armature mounted from the stator for straight-line movement with respect to the stator, the stator having two pairs of salient poles disposed so that the two poles of each pair face one another across the axis of movement of the armature, the armature in the region of each stator pole pair having two salient poles to cooperate with those two stator poles, a winding for each stator pole, means for energising those windings from a source of alternating voltage, and interconnections between those windings for deriving an output voltage which is dependent in amplitude and phase with respect to the source voltage on the extent and direction of the movement of the armature over a restricted range from a datum position with respect to the stator.

Figure 1:
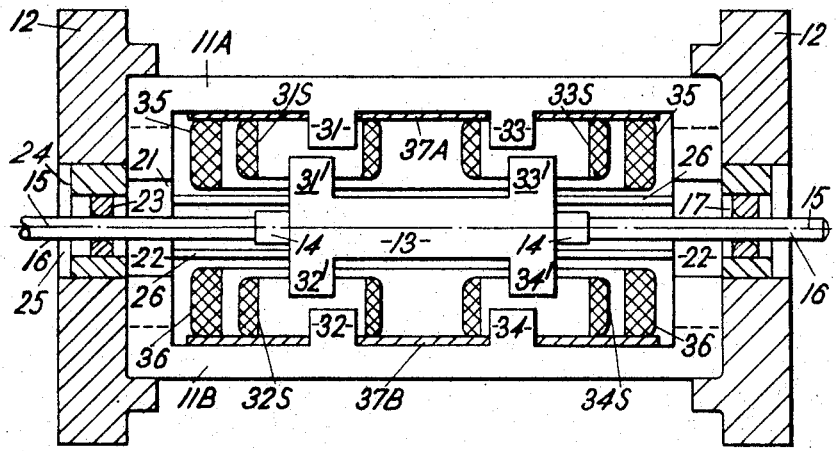
Figure 3:
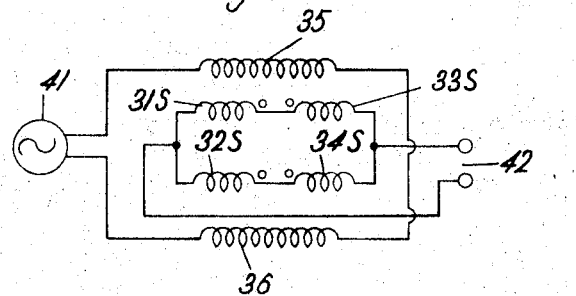
Figure 4:
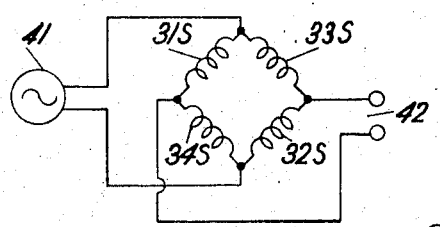
Figure 2:
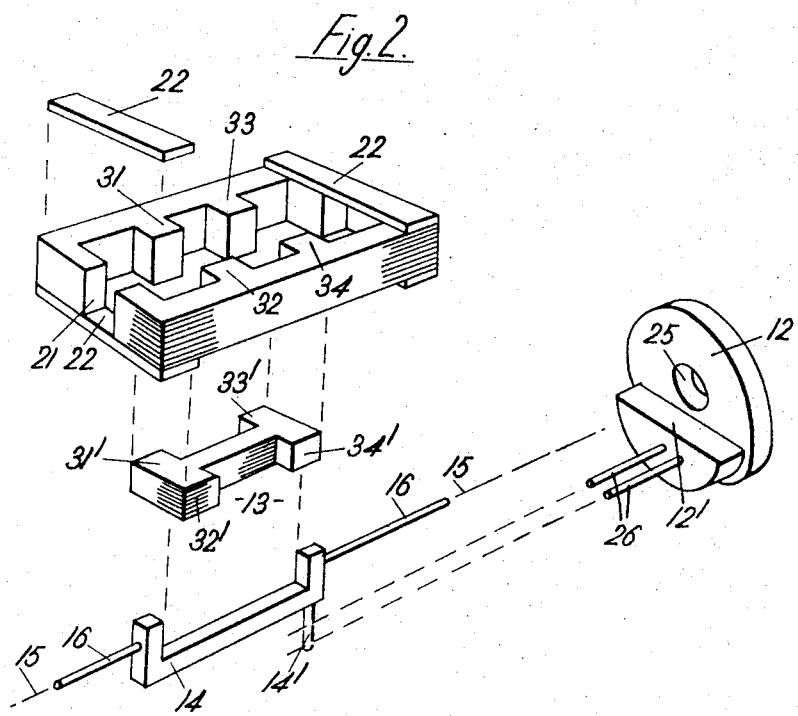

In the accompanying drawings,

FIGURE 1 is a view partly in section and somewhat simplified of one embodiment of the invention, FIGURE 2 shows a part of the pickoff of FIGURE 1 in exploded form to indicate the construction, and FIGURES 3 and 4 are diagrams of connections suitable for the pickoff of FIGURE 1.

In carrying out the invention in accordance with one form by way of example, see FIGS. 1 and 2 of the accompanying drawings, an inductive pickoff to respond to a straight-line movement includes a stator having two opposed stacks 11A and 11B of laminations supported between end discs 12 (only one of which is shown in FIG. 2) to the shelf $12^1$ of which the laminations are secured by cement. In cooperation with the stator is an armature consisting of a stack 13 of laminations coplanar with the stator laminations and carried by a cradle 14 of shallow U form. This cradle is mounted for movement along the straight axis 15 of the armature on rods 16 which are journalled in jewel bearings 17 (FIG. 1) where the rods pass through the end discs 12.

Each of the gaps 21 between the opposing stacks of stator laminations 11A and 11B between which the rods 16 pass to their bearings is bridged by closure members or keepers of magnetic material in the form of two plates 22, one on each side of the rod 16.

Rotation of the armature about its axis 15 is prevented by two closely parallel stays 26 (the spacing between which is exaggerated in FIG. 1 to prevent them from being obscured by rods 16) which extend parallel to axis 15 between the end discs 12 outside the stator laminations; these stays, which may be supported by both end discs, as shown, or extend in cantilever fashion from one only, engage between them a projecting part $14^1$ of cradle 14 which extends downwards from the plane of the paper and is therefore visible only in FIG. 2.

Each of bearings 17 (FIG. 1) consists of a ring jewel 23 which engages the rod 16. The jewel is carried by a ring mount 24 which is a close fit but rotatable in an aperture 25 in the corresponding disc 12. The outer surface of mount 24 is slightly eccentric with respect to axis 15 so that by rotating the mount the lateral position of the corresponding end of the axis may be adjusted.

The stacks 11A and 11B of stator laminations provide one pair of salient poles 31 and 32 which face one another across axis 15, and a second and similar pair 33 and 34 displaced from the first pair along the axis. Cooperating respectively with these stator poles are salient poles $31^1$ to $34^1$ formed by the stack of armature laminations 13, there being a small airgap, sufficient to allow unobstructed movement of the armature, between each stator pole and the cooperating armature pole. The stator and armature poles are so located with respect to one another in the direction of axis 15 that when the armature is in a datum or null position along the axis with respect to the stator the cooperating stator and armature poles overlap one another by a half of their pole faces, stator poles 31 and 33 being displaced towards one another, and similarly poles 32 and 34, from the position of full registration. The armature is shown in this datum position in FIG. 1.

The stator poles are provided with windings 31S to 34S, respectively, which though fixed to the stator nevertheless extend over the cooperating armature poles so that the airgap between each pair of cooperating poles lies approximately at the axial centre, or in the central plane, of the winding; the inner dimensions of these windings are made large enough to permit the required range of armature movement. To energise poles 31 and 33, and hence windings 31S and 33S, a winding 35 is formed around those windings, as shown; winding 35 also extends over armature poles $31^1$ and $33^1$ with the airgap between them and poles 31 and 33 in approximately its central plane. A similar winding 36 is provided to energise poles 32 and 34 and windings 32S and 34S. These two windings 35 and 36 may conveniently be thought of as primary windings, with windings 31S and 34S the associated secondaries. All the windings are secured to stacks 11A and 11B by boards 37A and 37B of insulation in a manner to be described.

As shown in FIG. 3, the primary windings 35 and 36 are arranged to be energised in series with one another by a source 41 of alternating voltage. The windings may however be energised in parallel. Secondary windings 31S and 33S are connected to one another in series opposition and in parallel with windings 32S and 34S, which are also in series opposition. This parallel combination is connected to output terminals 42. Thus no voltage is apparent at those terminals except under conditions of unbalance, to be described.

In operation, the energisation of primary windings 35 and 36 sets up an alternating flux between stator poles 31 and 32 which mainly passes by way of the cooperating armature poles $31^1$ and $32^1$. Similarly with the other stator and armature poles. So long as the armature is in the null or datum position depicted, the reluctance of the flux path between poles 31 and 32 is the same as that between poles 33 and 34, so that the voltages induced in the secondary windings are all equal. Thus the voltages from windings 31S and 32S balance those from windings 33S and 34S, with the result that no voltage is apparent at the output terminals 42.

Any movement of the armature to the left (as seen in the drawing) decreases the extents of overlap of armature poles $31^1$ and $32^1$ with the stator poles 31 and 32 and so increases the reluctance of the flux path between those stator poles; such a movement on the other hand correspondingly decreases the reluctance of the path between poles 33 and 34, by increasing the extents of overlap. Thus an unbalance condition is set up, the secondary voltages from windings 33S and 34S now exceeding those from windings 31S and 32S; accordingly an output voltage is developed at output terminals 42. The amplitude of this output voltage is dependent to a substantially linear degree on the extent of the movement from the datum position and the voltage is in phase or in counterphase with the source voltage in dependence on the sense of the interconnections between the secondary windings and the output terminals.

Any movement of the armature in the opposite direction also sets up a voltage unbalance; but this time the phase of the output voltage with respect to the source voltage is the reverse of what it was for the left-hand direction of movement.

This output voltage may be applied in known manner to provide an indication of the extent of the movement from the datum position, or to operate follow-up servo apparatus to control whatever object the pickoff is connected to so as to maintain the armature close to the datum position, thereby continuously nulling the output voltage.

Known types of straight-line pickoffs in which stator poles are provided on only one side of the armature suffer from the disadvantage that any displacement of the armature in a direction normal to that of its movement alters the lengths of the airgaps and hence the reluctances of the flux paths, thereby changing the sensitivity of response. Similarly a tilt of the armature in a plane parallel to the pole planes shortens one gap and lengthens the other, thereby causing a zero drift—that is, shifting the datum position along the armature axis. Neither of these disadvantages is present in a pickoff in accordance with the invention where stator poles are located on both sides of the armature, for any shift of either end of the armature towards one stator pole is accompanied by an equal shift away from the cooperating stator pole, with the result that the total length of the airgaps between those two poles and hence the reluctance of the flux path between them remains unchanged. Thus a slight lateral displacement of the armature does not change the sensitivity, nor does a slight tilt change the position of the datum point.

The location of each airgap in approximately the central plane of the associated windings brings the advantages that as the flux in this region is a maximum and changes negligibly in value in directions towards and away from the rotor axis, a high degree of sensitivity is obtained and the exact location in these directions of the windings is not critical.

One of the support rods 16 of the armature may end in a probe, so that the response of the pickoff may be used in a process for measuring the distance of a workpiece surface from a structure which carries the stator of the pickoff.

The pickoff may conveniently be constructed as follows.

Each stack of stator laminations—stack 11A, for example—is resin bonded to the associated windings 31S, 33S, and 35 which are preformed on insulation board 37A (above referred to) which forms part of the assembly and imparts lateral rigidity to it. The other windings are similarly preformed on the other board 37B. The two sub-units thus prepared are assembled in a jig together with the end discs 12, the keeper plates 22, and the armature 13; the laminations of the armature are already bonded to the supporting cradle 14, and its supporting rods 16 are passed through the jewel bearings 17 in the end discs.

Primary windings 35 and 36 are now energised, and the distance across gaps 21 between the stator stacks are adjusted (by micrometer wedges forming part of the jig) until the airgaps between the stator and armature poles have the lengths appropriate to the degree of sensitivity required. The alignment of axis 15 is also adjusted by rotating the eccentric bearing mounts 24. When these adjustments have been concluded, the stator sub-units are bonded to the keeper plates and end discs.

The above-described embodiment may be modified in various ways within the scope of the invention. For example, the two primary windings 35 and 36 may be replaced by a single primary winding which extends across axis 15 of the pickoff leaving a small gap for rods 16 to pass through. Conversely, each secondary winding may be provided with a primary winding individual to it. To improve the uniformity of flux distribution in the gaps, each winding may be split into two or more sections which may be graded as to the number of turns and may be displaced with respect to one another along the winding axis.

The primary and secondary windings may be replaced by a single winding for each cooperating pair of stator and armature poles—that is, for each airgap. The arrangement is then as shown in FIG. 1, but with the two windings 35 and 36 omitted. The remaining four stator windings 31S and 34S are energised by direct connections from the source 41. Conveniently, the four windings are connected as the arms of a bridge network as shown in FIG. 4. The voltage from source 41 is applied to one pair of diagonal points and the output to terminals 42 derived from the other pair.

Instead of being formed as two stacks of laminations, the stator core may be formed of one stack each lamination of which has the shape of laminations 11A and 11B combined by the bridging of gaps 21. The closing of those gaps will necessitate the drilling of a tunnel through each end of the stacks for rods 16.

What we claim is:

1. An electromagnetic pickoff device including a stator, an armature mounted from the stator for straight-line movement with respect to the stator, the stator having two pairs of salient poles disposed so that the two poles of each pair face one another across the axis of movement of the armature, the armature in the region of each stator pole pair having two salient poles to cooperate with those two stator poles, a winding for each stator pole, means for energising those windings from a source of alternating voltage, and interconnections between those windings for deriving an output voltage which is dependent in amplitude and phase with respect to the source voltage on the extent and direction of the movement of the armature over a restricted range from a datum position with respect to the stator.

2. A device as claimed in claim 1 wherein the armature poles are so shaped and located with respect to the stator poles when the armature is in the datum position that when the armature departs in one or other direction from that position the fluxes between the respective stator pole pairs are unbalanced in one or other sense.

3. A device as claimed in claim 1 wherein the means for energising the windings include a primary winding system inductively coupled to the stator windings and connected to be energised by said source.

4. A device as claimed in claim 3 wherein the primary winding system is so disposed as to set up an alternating magnetic flux which extends between the poles of each stator pair, to at least some extent by way of the cooperating armature poles.

5. A device as claimed in claim 1 wherein the means for energising the windings include connections from said source to the interconnections between the windings.

6. A device as claimed in claim 5 wherein the windings are interconnected as the arms of a bridge, the source voltage being applied across one diagonal of the bridge and the output voltage being derived from the other diagonal.

7. A device as claimed in claim 6 wherein the windings are so interconnected to one another and to the source as to set up an alternating magnetic flux which extends between the poles of each stator pair, to at least some extent by way of the cooperating armature poles.

8. A device as claimed in claim 1 wherein the windings extend over the armature poles so that the airgap between each stator pole and the cooperating armature pole lies approximately at the axial centre of the associated winding, the inner dimensions of the windings being such as to allow the movement of the armature over the restricted range.

9. A device as claimed in claim 3 wherein each primary winding extends over the armature poles so that the airgap between each stator pole and the cooperating armature pole lies approximately at the axial centre of the associated primary winding, the inner dimensions of the primary windings being such as to allow the movement of the armature over the restricted range.

10. A device as claimed in claim 1 wherein the armature is supported for said movement so as to allow the alignment of said axis with respect to the stator to be adjusted.

11. A device as claimed in claim 10 wherein the armature is supported on at least one bearing which is eccentrically mounted so that by rotating the mount the lateral position of the corresponding end of said axis is adjustable.

References Cited

UNITED STATES PATENTS

| | | | |
|---|---|---|---|
| 2,596,712 | 5/1952 | Mueller | 336—130 X |
| 3,094,635 | 6/1963 | Wysocki | 310—15 X |
| 3,205,485 | 9/1965 | Noltingk | 340—196 |
| 3,281,655 | 10/1966 | Blasingame | 323—51 |

JOHN F. COUCH, *Primary Examiner.*

W. E. RAY, *Assistant Examiner.*